Figure 1:
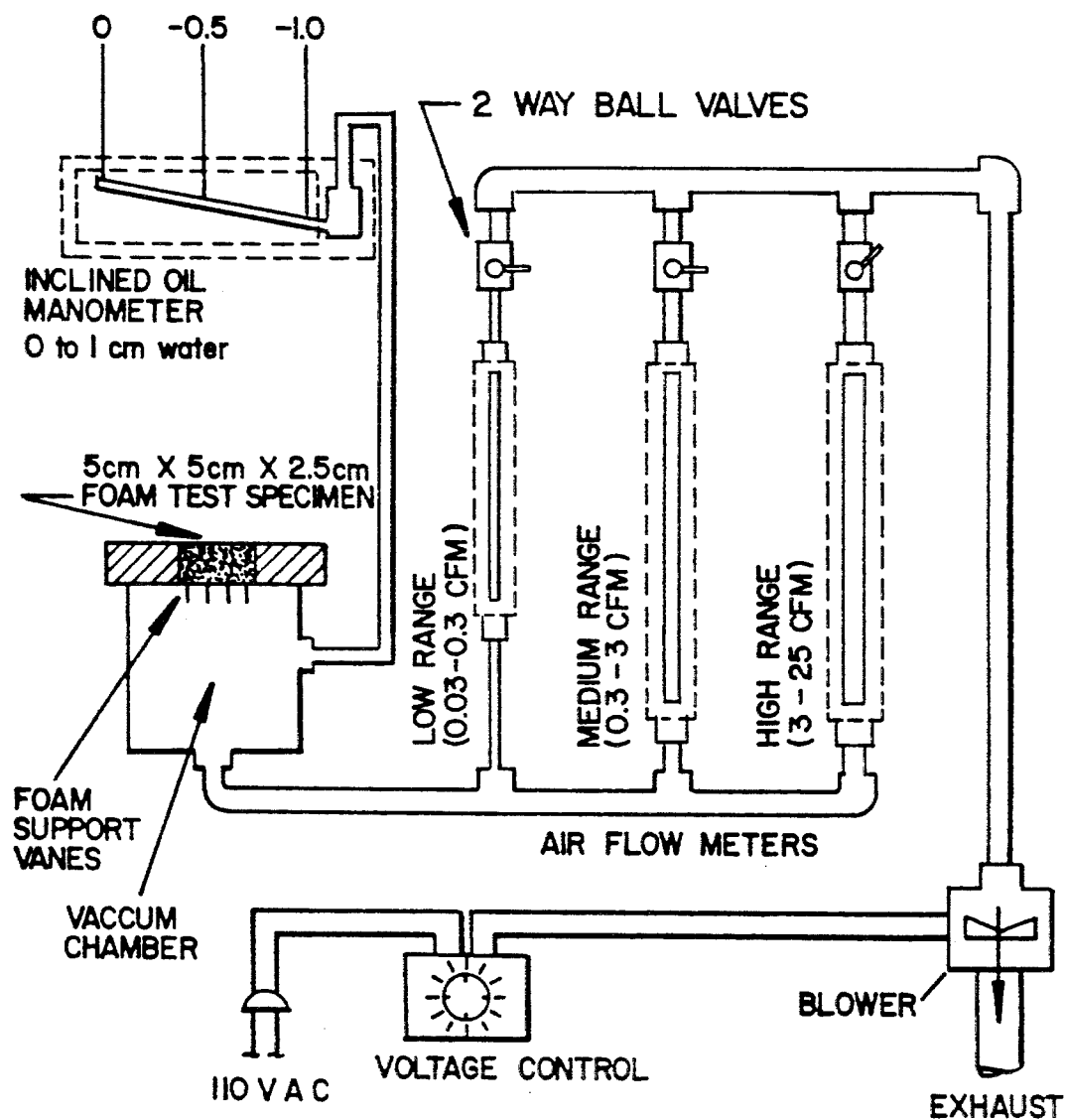

United States Patent [19]

Grabowski

[11] Patent Number: 5,070,112
[45] Date of Patent: Dec. 3, 1991

[54] PROCESS FOR MAKING FLEXIBLE POLYURETHANE FOAM

[75] Inventor: Wojciech Grabowski, Versoix, Switzerland

[73] Assignee: Union Carbide Chemicals and Plastics Technology Corporation, Danbury, Conn.

[21] Appl. No.: 612,520

[22] Filed: Nov. 13, 1990

[30] Foreign Application Priority Data

Nov. 14, 1989 [GB] United Kingdom ............... 8925667

[51] Int. Cl.$^5$ ............................................. C08J 9/12
[52] U.S. Cl. ........................................ 521/112; 521/904
[58] Field of Search ............................. 521/112, 904

[56] References Cited

U.S. PATENT DOCUMENTS 2,834,748 5/1958 Bailey .................................. 260/42
4,119,582 10/1978 Matsubara ......................... 521/112

FOREIGN PATENT DOCUMENTS 0043110 1/1982 European Pat. Off. .
0092700 11/1983 European Pat. Off. .
2128582 3/1972 France .

Primary Examiner—Morton Foelak
Attorney, Agent, or Firm—William F. Gray

[57] ABSTRACT

A process for making flexible polyurethane foam, employing a silicone surfactant composition containing 5-20 wt % of a defined low molecular weight silicone surfactant and 95-80 wt % of a defined high molecular weight silicone surfactant. Use of the claimed mixture of surfactants provides product foams having improved breathability relative to foams produced using high molecular weight silicone surfactant alone.

4 Claims, 1 Drawing Sheet

PROCESS FOR MAKING FLEXIBLE POLYURETHANE FOAM

The present invention relates to a process for making flexible polyurethane foam. In particular, the present invention relates to a process for making conventional "hot-cure" flexible polyurethane foams having improved breathability.

Flexible polyurethane foam is a known material and is widely used for making bedding, furniture cushions and seating. Such foam is conventionally prepared by a "hot-cure" process in which the foam, when fully risen, is heated at an elevated temperature e.g. 130°-150° C., in order to effect its cure. The manufacture of such foams has previously involved the use of silicone surfactants of high molecular weight to stabilise the foam.

A problem arises when such surfactants are used to produce low density foam. Low density foam requires the use of high levels of silicone surfactant to stabilise the foam. Unfortunately the use of high levels of silicone surfactant produces cells in which the openness of the foam cells is low. As a result such foams are slow to recover after compression, i.e. they exhibit poor breathability.

It has now been found that when a high molecular weight silicone surfactant (MW typically in the range 10,000–20,000) is replaced by a silicone surfactant mixture comprising a minor amount of a low molecular weight silicone surfactant and a major amount of a high molecular weight surfactant, the breathability of the foam produced at a given silicone surfactant level is improved.

Accordingly, the present invention provides a process for preparing flexible polyurethane foam which process comprises reacting and foaming a foam formulation comprising (1) a polyol selected from a polyether polyol or a polymer polyol wherein the polyol is one having an average functionality in the range 2 to 6 and in which less than 20% of the hydroxyl groups are primary hydroxyl groups, (2) an isocyanate composition containing toluene diisocyanate, (3) a catalyst for the polyurethane forming reaction, and (4) a blowing agent characterised in that the foam formulation further comprises a silicone surfactant composition which comprises a mixture of (a) between 5 and 20 wt % of a lower molecular weight silicone surfactant having the formula

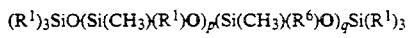

wherein (i) x and y are such that $$x + y = 2 - 10$$

and $$\frac{y}{x + y} = 0.1 - 0.5$$

(ii) the $R^1$ groups are independently selected from $C_1$ to $C_{10}$ hydrocarbyl groups (iii) the $R^2$ group are independently selected from groups having the generic formula

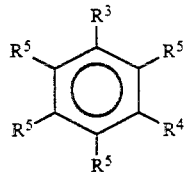

wherein $R^3$ is a divalent hydrocarbyl group; $R^4$ is a polar group selected from —OH, —NH$_2$, Cl, Br, and CH$_2$OH and the $R^5$ groups are independently selected from hydrogen or $C_1$ to $C_{10}$ alkyl or alkoxy groups and (b) between 95 and 80 wt % of a high molecular weight silicone surfactant having the formula

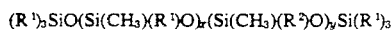

wherein (i) p = 40 – 150
(ii) q = 3 – 15
(iii) $R^6$ is an ethylene oxide/propylene oxide copolymer having a molecular weight in the range 1500–5000 capped with alkoxy at one end and bound to silicon by a divalent hydrocarbyl group.

the molecular weight of the high molecular weight silicone surfactant being in the range 10,000 to 50,000.

As regards the low molecular weight silicone surfactant, this is preferably one in which the $R^1$ group is a methyl group and wherein x+y is between 6 and 10. It is also preferable that the $R^2$ groups are ones where $R^4$ is a hydroxyl or oxygen containing group.

The high molecular weight silicone surfactant is preferably one of the readily available silicone surfactants which are used in hot-cure foam formulations. It is preferred to use such a silicone surfactant in which the $R^1$ groups are methyl groups and p and q are respectively in the ranges 60–80 and 5–9.

The other components of the hot-cure foam formulation are well known to those skilled in the art. The polyol, for example, is either a polyether polyol or a polymer polyol. Polyether polyols of the type contemplated are those prepared by reacting a low molecular weight polyfunctional alcohol e.g. glycerol, trimethyolpropane, 1,2,6-hexanetriol, pentaerythritol, sorbitol, sucrose and the like, with one or more alkylene oxides. The alkylene oxides are preferably lower alkylene oxides for example, ethylene oxide, propylene oxide, butylene oxide or mixtures thereof. Polyether polyols produced by this method can be made with a range of physical and chemical properties depending upon the degree of polymerisation, the relative proportions of the different alkylene oxides in the polyether part of the molecule etc and the particular alkylene oxides used. Polymer polyols which comprise a polyether polyol onto which has been grafted a vinyl polymer or copolymer (e.g. styrene/acrylonitrile) have been described in detail in for example GB 1412797 and EP 137723.

As mentioned above, the polyol is one having an average functionality in the range 2 to 6, preferably 2 to 3.5, and in which less than 20% of the hydroxyl groups are primary hydroxyl groups. It is also preferable that the molecular weight of the polyol is in the range 1500 to 8000.

The isocyanate composition used is one which contains toluene diisocyanate (TDI). The toluene diisocyanate, which typically exists as a mixture of isomers, may be present as such, in the form of a prepolymer with the polyol or mixed with other polyfunctional isocyanates, e.g. MDI and the like. In general the relative proportions of isocyanate composition and polyol should be such as to produce an isocyanate:polyol ratio of between 0.8 and 1.2, preferably 0.9 and 1.1 when calculated on an equivalent basis.

As the polyurethane foaming reaction is base catalysed the reaction is suitably carried out in the presence of a base catalyst. The base catalyst may be any one of a wide range of inorganic or organic bases. Particularly suitable examples of catalysts include tertiary amines e.g. tributylamine, N-methylmorpholine, DABCO, TBD, 1,3-propanediamine and organic tin compounds e.g. tin (II) alkoxides tin (II) carboxylates, dialkyl tin salts of carboxylic acids or hydrohalic acids.

Other catalysts, for example derivatives of lead, antimony, titanium and mercury which are not so widely used in industry can also be used.

The amounts of such catalyst which are to be used will be familiar to the skilled man.

In order to produce a foam it is necessary to have present during the polyurethane forming reaction a blowing agent. Preferably the blowing agent is either water or a fluorocarbon blowing agent such as dichlorodifluoromethane, 1,1-dichloro-1-fluoroethane, 1-chloro-1,1-difluoroethane, 2,2-dichloroethane and the like. The amount of blowing agent required will vary according to the density of the foam which is desired. Suitable levels of blowing agent will be familiar to the skilled man.

In manufacturing the flexible polyurethane foam, the components of the foam formulation are mixed and the resulting formulation allowed to foam. The fully risen foam is then cured at a temperature of between 130°–150° C.

The present invention is now further described with reference to the following Examples.

A series of polyurethane foam formulations were prepared having the following compositions:

| | | |
|---|---|---|
| Polyol U 10.01 (ex BP) | 100 | parts |
| Water | 4.7 | parts |
| A-1 catalyst (ex BP) | 0.1 | parts |
| SO catalyst | 0.2 | parts |
| U-11 - fluorcarbon | 0.2 | parts |
| Silicone surfactant | 1.0 | parts |

Each foam formulation was allowed to cream and rise. The risen foam was cured under standard conditions.

When fully cured the breathability of each was measured using the apparatus in FIG. 1.

BREATHABILITY TEST

A cut sample of the foam (5 cm × 5 cm × 2.5 cm) was mounted in the top of the vacuum chamber. Using one of the three flowmeters air was blown through the foam to the outside. The flow of air was in each case adjusted so that the manometer recorded a pressure of 0.25 mm of water across the 1.27 cm thickness of sample. The Table shows the flow rates obtained in cubic feet per minute.

In the Table the silicone surfactants are as follows.

A: $(CH_3)_3SiO(Si(CH_3)_2O)_{72}(Si(CH_3)(C_3H_6(OC_2H_4)_{22}(OC_3H_6)_{22}(OCH_3))O)_{5.5}Si(CH_3)_3$

B: 90% A
10% $(CH_3)_3SiO(Si(CH_3)_2O)_7(Si(CH_3)R^2O)_2Si(CH_3)_3$
($R^2$ = allyphenol)

C: 90% A
10% $(CH_3)_3SiO(Si(CH_3)_2O)_7(Si(CH_3)R^2O)_2Si(CH_3)_3$
($R^2$ = methoxyeugenol)

D: 90% A
10% $(CH_3)_3SiO(Si(CH_3)_2O)_8(Si(CH_3)R^2O)Si(CH_3)_3$
($R^2$ = methoxyeugenol)

E: 90% A
10% $(CH_3)_3SiO(Si(CH_3)_2O)_7(Si(CH_3)R^2O)_2Si(CH_3)_3$
($R^2$ = safol)

F: 90% A
10% $(CH_3)_3SiO(Si(CH_3)_2O)_7(Si(CH_3)R^2)_2Si(CH_3)_3$
($R^2$ = eugenol)

| Example | Foam Breathability (cubic feet/minute |
|---|---|
| A | 2.0 |
| B | 3.5 |
| C | 5.5 |
| D | 5.0 |
| E | 4.7 |
| F | 3.9 |

Although the $R^2$ groups are termed allyphenol, methoxyeugenol, safol and eugenol for convenience it will be obvious to the skilled man that the $R^2$ groups are in fact the moiety obtained when such a species is reacted with a Si—H bond.

I claim:

1. A process for preparing flexible polyurethane foam, which process comprises reacting and foaming a foam formulation comprising:

(1) a polyol selected from the group consisting of polyether polyols and polymer polyols, wherein the polyol is one having an average functionality in the range 2 to 6 and in which less than 20% of the hydroxyl groups are primary hydroxyl groups, (2) an isocyanate composition containing toluene diisocyanate, (3) a catalyst for the polyurethane forming reaction, and (4) a blowing agent, characterized in that the foam formulation further comprises a silicone surfactant composition which comprises a mixture of (a) between 5 and 20 wt % of a lower molecular weight silicone surfactant having the formula $$(R^1)_3SiO(Si(CH_3)(R^1)O)_x(Si(CH_3)(R^2)O)_ySi(R^1)_3$$

wherein
(i) x and y are such that $$x + y = 2 - 10$$

and $$\frac{y}{x + y} = 0.1 - 0.5$$

(ii) the $R^1$ groups are independently selected from $C_1$ to $C_{10}$ hydrocarbyl groups (iii) the $R^2$ group are independently selected from groups having the generic formula

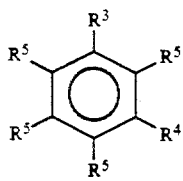

wherein $R^3$ is a divalent hydrocarbyl group; $R^4$ is a polar moiety selected from the group consisting of =OH, —$NH_2$, Cl, —Br, and —$CH_2OH$, and the $R^5$ groups are independently selected from hydrogen or $C_1$ to $C_{10}$ alkyl or alkoxy groups; and (b) between 95 and 80 wt % of a high molecular weight silicone surfactant having the formula

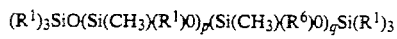

(i) p=40-150

(ii) q=3-15

(iii) $R^6$ is an ethylene oxide/propylene oxide copolymer having a molecular weight in the range 1500-5000 capped with alkoxy at one end and bound to silicon by a divalent hydrocarbyl group;

the molecular weight of the high molecular weight silicone surfactant being in the range 10,000 to 50,000.

2. The process of claim 1 wherein in said low molecular weight surfactant, $R^1$ is methyl, and x+y is 6-10.

3. The process of claim 1 wherein in said low molecular weight surfactant, $R^4$ is —OH or —$CH_2OH$.

4. The process of claim 1 wherein in said high molecular weight surfactant, $R^1$ is methyl, p is in the range 60-80, and q is in the range 5-9.

* * * * *